March 8, 1927. 1,620,454
R. FARREN
SAW
Filed June 26, 1925
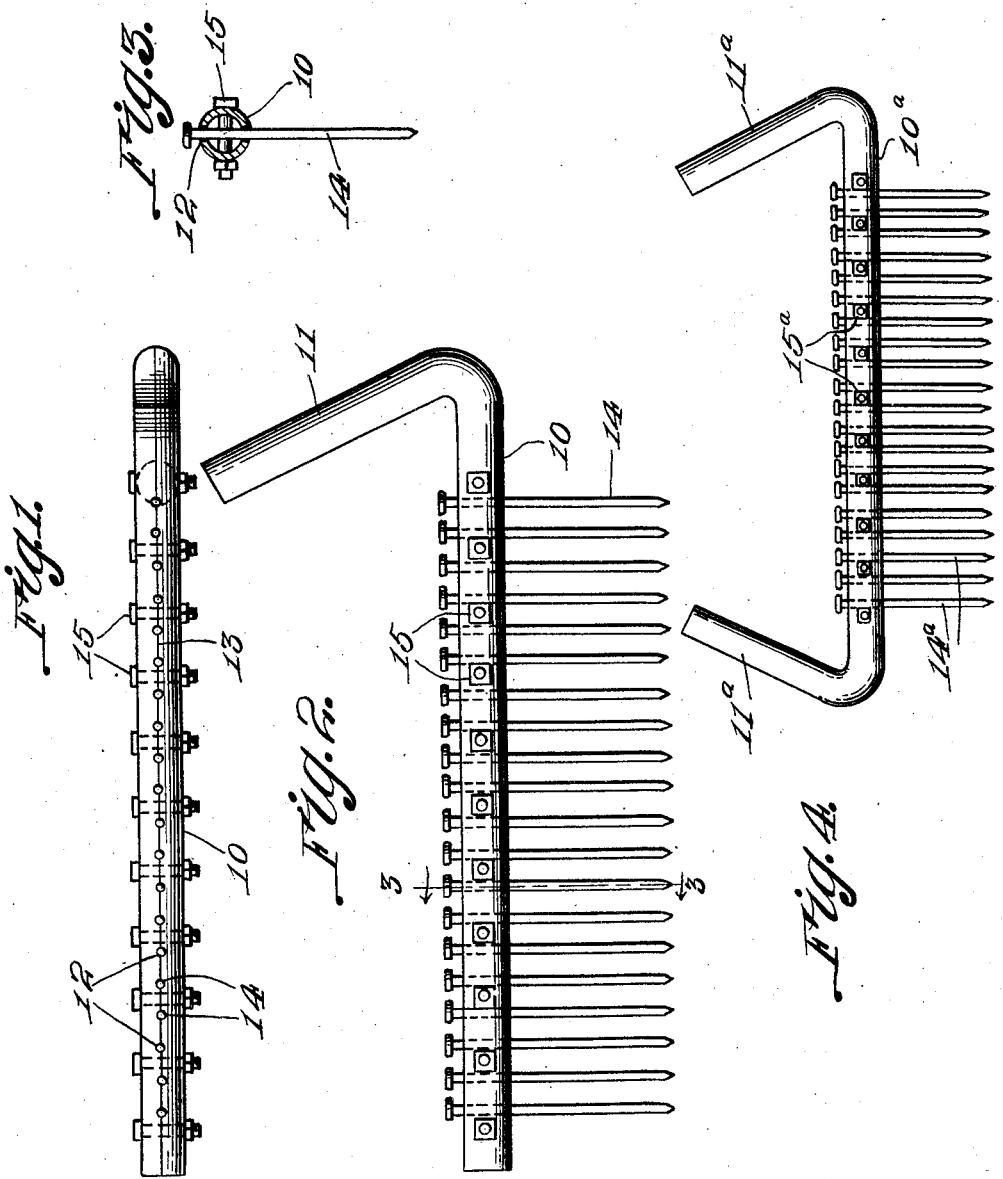
Roy Farren, INVENTOR Patented Mar. 8, 1927.

1,620,454

UNITED STATES PATENT OFFICE.

ROY FARREN, OF LAKE WORTH, FLORIDA.

SAW.

Application filed June 26, 1925. Serial No. 39,814.

This invention relates to improvements in saws especially designed for cutting such material as cement blocks, bricks, tile and other material having sand as one of its constituents.

In sawing material of this character, ordinary saw teeth are rapidly worn due to the sandy character of such material so that the saw speedily becomes useless. The teeth of the saw constituting the present invention however, are of a character to permit of considerable wear without impairing their usefulness and when worn, may be adjusted for further use, or may be separately and readily replaced.

Another object of the invention is the provision of a saw which may be made of inexpensive materials and in which ordinary nails may be utilized to form the teeth.

With the above and other objects in view, the invention further includes the following novel features and details of construction, to be hereinafter more fully described, illustrated in the accompanying drawings and pointed out in the appended claims.

In the drawings:—

Figure 1 is a bottom edge view of a saw constructed in accordance with the invention.

Figure 2 is a side view of the same.

Figure 3 is a section taken substantially on the line 3—3 of Figure 2.

Figure 4 is an elevation showing a saw having a double handle.

Referring to the drawings in detail wherein like characters of reference denote corresponding parts, the saw which may be made of various materials is shown as comprising a pipe section 10 which is shaped at one end to provide a handle or grip 11, the portion 10 forming the back of the saw. This portion 10 is provided with spaced openings 12 and is split longitudinally of the back and centrally through the openings as indicated at 13. Ordinary yieldable nails 14 or similar yieldable elements are passed through these openings and the split sections of the pipe are secured together by means of spaced bolts 15. The nails 14 which form the teeth of the saw are thus securely clamped in place so that they may be adjusted to regulate the length of the teeth in accordance with the character of the work. When the ends of the nails or teeth become worn, they may be further adjusted so that the life of the saw will be considerably increased. In addition, the teeth may be replaced when necessary or desired and nails of different sizes may be used. If desired specially constructed hardened nails or pins may be utilized, but it has been found that for sawing material of the character mentioned, the ordinary nails answer the purpose. Since the nails, teeth or pins 14 are hardened, there is substantial resiliency in the teeth. This resiliency allows the teeth or nails to spring, in case of pressure on the saw during its action in sawing cement blocks, bricks, tile, or similar material. In other words, the teeth will bend slightly in one direction or the other as the saw moves backward and forward, and then the teeth will spring back to normal shape. This springing action is also due to the teeth being of substantial length. Furthermore, the teeth can be adjusted, and since they extend a substantial distance from the pipe section 10, the teeth are allowed to flex.

The form of the invention illustrated in Figure 4 of the drawings is substantially the same as that previously described, except that instead of having a handle or grip at one end only, a handle or grip 11ᵃ is provided at each end.

The invention is susceptible of various changes in its form, proportions and minor details of construction and the right is herein reserved to make such changes as properly fall within the scope of the appended claim.

Having described the invention what is claimed is:—

In a saw for cutting cement blocks, bricks, tile and the like the combination with a back constructed from the length of pipe, said pipe having a handle at one end, said pipe being split longitudinally and provided with spaced openings, the split extending centrally across the diameter of the openings, of a plurality of pointed elements positioned within the openings and extending through the pipe and having substantially long resilient portions constituting teeth, and means passing through the pipe at right angles and intervening certain of the openings to connect the split portions of the pipe, the teeth being slightly larger in diameter than the diameter of the openings, whereby upon tightening up the connecting means of the split portions, the teeth may be clamped tightly in place.

In testimony whereof I affix my signature.

ROY FARREN.